US012613050B2

(12) United States Patent
Maitra et al.

(10) Patent No.: US 12,613,050 B2
(45) Date of Patent: Apr. 28, 2026

(54) MACHINE TEACHING WITH METHOD OF MOMENTS FOR MECHANICAL SYSTEMS

(71) Applicant: MICROSOFT TECHNOLOGY LICENSING, LLC, Redmond, WA (US)

(72) Inventors: Kingsuk Maitra, Fremont, CA (US); Brendan Lee Bryant, Kirkland, WA (US); Kence Anderson, Berkeley, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 881 days.

(21) Appl. No.: 17/948,074

(22) Filed: Sep. 19, 2022

(65) Prior Publication Data

US 2024/0093900 A1 Mar. 21, 2024

(51) Int. Cl.
*F24F 11/64* (2018.01)
*G05B 13/02* (2006.01)
(Continued)

(52) U.S. Cl.
CPC .......... *F24F 11/64* (2018.01); *G05B 13/0265* (2013.01); *F24F 2110/12* (2018.01); *F24F 2140/20* (2018.01)

(58) Field of Classification Search
CPC ..... F24F 11/64; F24F 2110/12; F24F 2140/20
See application file for complete search history.

(56) References Cited

U.S. PATENT DOCUMENTS

2014/0107850 A1* 4/2014 Curtis ..................... F24F 11/46
700/291
2016/0334122 A1* 11/2016 Shiel ......................... F24F 11/30
(Continued)

FOREIGN PATENT DOCUMENTS

CN       112503746 A     3/2021
EP        3961114 A1     3/2022

OTHER PUBLICATIONS

International Search Report and Written Opinion received for PCT Application No. PCT/US2023/030765, Nov. 30, 2023, 14 pages.
(Continued)

*Primary Examiner* — Nicholas Klicos
(74) *Attorney, Agent, or Firm* — David Foster; Newport IP, LLC

(57) ABSTRACT

The techniques disclosed herein enable utilizing a full range of setpoint values to control a mechanical system. A machine learning model is trained with states collected from the mechanical system. Some of the states may have little to no variation, limiting exploration of possible setpoint values when training the model. To enable a more thorough exploration of possible setpoint values, the states are augmented with a fluctuating delta value that is derived from a fixed setpoint value. For example, a delta outside air temperature may be computed by subtracting outside air temperature, which fluctuates, from a fixed chilled water setpoint. A method of moments computation converts delta values inferred by the model back into absolute values. The absolute values are used to compute a regression equation that is usable by the mechanical system to compute a setpoint action for a given set of input states.

20 Claims, 12 Drawing Sheets

(51) Int. Cl.
  *F24F 110/12*      (2018.01)
  *F24F 140/20*      (2018.01)

(56)                References Cited

U.S. PATENT DOCUMENTS

| | | | |
|---|---|---|---|
| 2018/0113482 A1* | 4/2018 | Vitullo ................... | G06N 20/20 |
| 2018/0204116 A1* | 7/2018 | Evans ................... | G06N 3/045 |
| 2018/0209675 A1* | 7/2018 | Ridder ................... | F24F 3/001 |
| 2019/0324421 A1* | 10/2019 | Johnson, Jr. ............. | F24F 11/62 |
| 2019/0331349 A1* | 10/2019 | Smith ................. | G05B 19/042 |
| 2021/0303998 A1* | 9/2021 | Manoharan ............. | G06N 3/04 |
| 2022/0113049 A1 | 4/2022 | Maitra et al. | |
| 2022/0245574 A1* | 8/2022 | Cella ................... | G06Q 10/087 |
| 2022/0316747 A1* | 10/2022 | McGill ................... | F24F 11/86 |

OTHER PUBLICATIONS

International Preliminary Report on Patentability received for PCT Application No. PCT/US23/030765, Apr. 3, 2025, 09 pages.

* cited by examiner

ABSOLUTE CHILLER WATER SETPOINT ACTIONS 522

METHOD OF MOMENTS DELTA TO ABSOLUTE CONVERSION ENGINE 530

DELTA ACTIONS 420

ΔRWT = CHILLED WATER SETPOINT – RETURN WATER TEMPERATURE 812

CHILLED WATER SETPOINT RANGE 814

BALANCE POINT 802

ΔOAT = CHILLED WATER SETPOINT – OUTSIDE AIR TEMPERATURE 810

40° FAHRENHEIT 816

Figure 11:
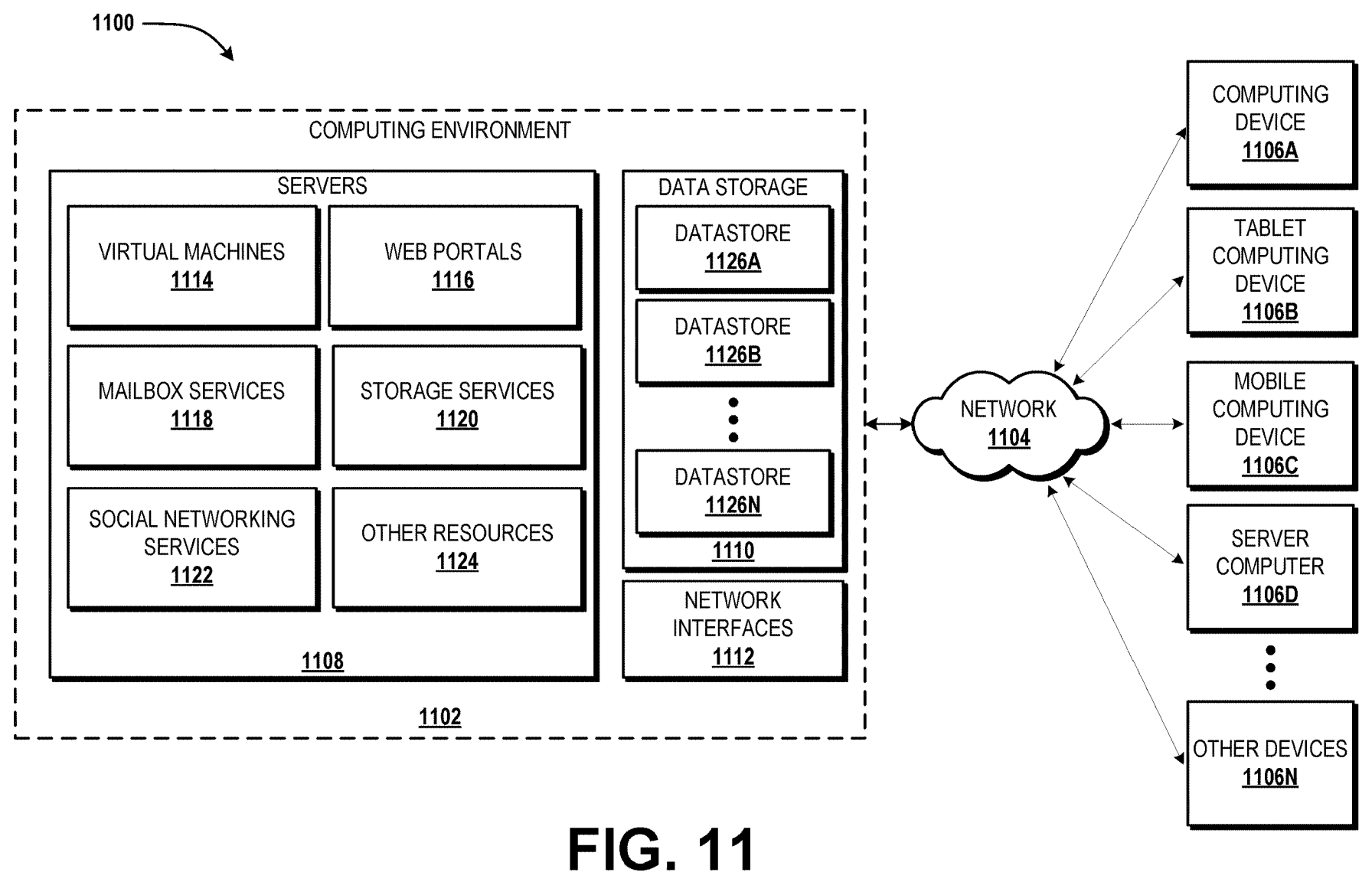

COMPUTING DEVICE 1106A

TABLET COMPUTING DEVICE 1106B

MOBILE COMPUTING DEVICE 1106C

SERVER COMPUTER 1106D

• • •

OTHER DEVICES 1106N

NETWORK 1104

COMPUTING ENVIRONMENT

DATA STORAGE

DATASTORE 1126A

DATASTORE 1126B

• • •

DATASTORE 1126N

1110

NETWORK INTERFACES 1112

SERVERS

WEB PORTALS 1116

VIRTUAL MACHINES 1114

STORAGE SERVICES 1120

MAILBOX SERVICES 1118

OTHER RESOURCES 1124

SOCIAL NETWORKING SERVICES 1122

MACHINE TEACHING WITH METHOD OF MOMENTS FOR MECHANICAL SYSTEMS

BACKGROUND

Control systems are used for controlling supervisory setpoints of mechanical systems, such as flow rates of a manufacturing process or cooling levels of a heating, ventilation, and air-conditioning (HVAC) system. Supervisory setpoints—also referred to herein as "setpoints"—are often calibrated and set by technicians. However, setpoints set by technicians are often left unchanged for long periods of time, and as such may not result in efficient operation of the mechanical system. For example, variable demands on the system being controlled or unexpected changes in the operating environment may result in an inefficient outcome. Improper setpoints may also result in excessive wear, reduced operating effectiveness, or even damage to the system.

Machine-learning based techniques have been used for controlling setpoints of mechanical systems. However, it has proved challenging to obtain training data representative of the allowable range of setpoint values. For example, most HVAC chillers operate with a fixed chilled water setpoint (CHW SWS), e.g. 42 degrees Fahrenheit, when the range of allowable values is 40-55 degrees Fahrenheit. Operators are reluctant to experiment with different setpoint values without knowing that the system will continue to function effectively. As a result, there is a paucity of data collected in which a full range of setpoint values are represented. This limited range of real-world input values results in poor exploration of possible outputs when training a machine learning model. As a result, it is difficult if not impossible to train a machine learning model with fixed setpoint inputs to generate setpoint outputs that yield optimal results.

It is with respect to these and other considerations that the disclosure made herein is presented.

SUMMARY

The techniques disclosed herein enable utilizing a full range of setpoint values to control a mechanical system. A machine learning model is trained with states collected from the mechanical system. Some of the states may have little to no variation, limiting exploration of possible setpoint values when training the model. To enable a more thorough exploration of possible setpoint values, the states are augmented with a fluctuating delta value that is derived from a fixed setpoint value. For example, a delta outside air temperature may be computed by subtracting outside air temperature, which fluctuates, from a fixed chilled water setpoint. A method of moments computation converts delta values inferred by the model back into absolute values. The absolute values are used to compute a regression equation that is usable by the mechanical system to compute a setpoint action for a given set of input states.

The model may be trained with real-world state and action data collected during the operation of the mechanical system. In order to improve exploration of possible model outputs, states collected from the mechanical system that are fixed or limited in value may be augmented or replaced with related states that fluctuate in value. For example, a delta state that is related to the fixed state may be computed by subtracting a fluctuating state from the fixed state. In some configurations, a reinforcement learning technique is used to train the model with the additional/replacement states. The model may be trained, for example to generate setpoint actions that are usable to control temperature regulators, pumps, valves, and other components of the mechanical system.

There may be some initial relationship between states and actions encoded by the model, but before training these relationships are likely to be sub-optimal. During training the relationships between states and actions are improved as guided by the reward function. For example, the relationship between an outside air temperature state and a chilled water setpoint action may be improved as guided by the reward function.

Since the model has been trained on delta values, the setpoint actions it infers are delta actions. Delta actions do not represent real-world values, and as such are not directly applicable to control a real-world system. Method of moments is one technique for converting a delta action inferred by the model into an absolute action that can be used to control the mechanical system. In this way, method of moments is a powerful empirical technique that enables more exhaustive exploration when training on data with fixed, single value setpoints.

This more exhaustive exploration avoids the need to conduct expensive experiments that vary the setpoint value. These experiments may be disruptive to carry out on a live production line and/or may result in unexpected or undesirable behavior in the mechanical system. These experiments may also take more time than is practical to carry out, particularly when the disclosed techniques enable training on existing data.

In some configurations, instead of being used to directly infer setpoint actions from a real-time state of the mechanical system, the trained model is used to generate a an AI agent. One type of AI agent is a regression brain. As referred to herein, a regression brain is a procedure or equation that maps states of a mechanical system to a setpoint action. The regression brain is typically much simpler than a machine learning model, enabling it to be deployed for use on-site. For example, a regression brain may be a linear equation that maps one or more states to a setpoint action. Typically, the number of states used as input to a regression brain is less than the number of states used to train the model. Also, regression brain input states are typically selected so as not to be overdetermined. For example, an input state that represents a feedback, such as a return water temperature, is often excluded from a regression brain because it encodes information that is already encoded in other states used by the regression brain, such as load, outside air temperature, etc.

To create a regression brain, the machine learning model is used to generate a corpus of data points by inferring setpoint actions from sets of states of the mechanical system. A regression analysis is performed on the sets of states and corresponding setpoint actions to generate coefficients of the regression brain. For example, a least squares calculation may be applied to the sets of states and corresponding setpoint actions to identify a regression line. The regression brain uses the coefficients of the regression line when generating a setpoint action. Specifically, to apply the regression brain, states observed in the mechanical system in real-time may be multiplied by the appropriate regression line coefficients to produce a setpoint action.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 11 is a diagram illustrating a distributed computing environment capable of implementing aspects of the techniques and technologies presented herein.

DETAILED DESCRIPTION

Figure 1:
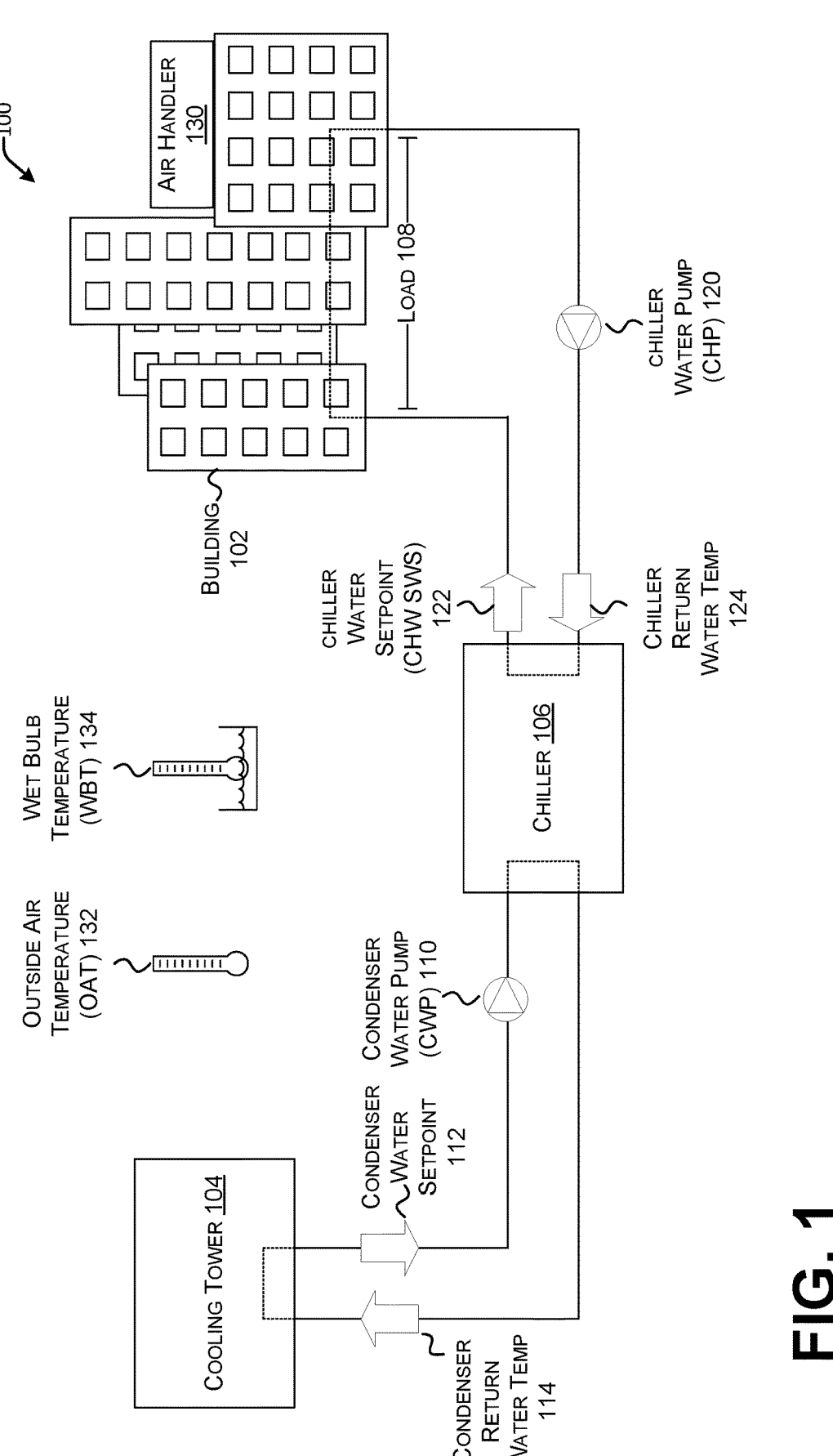
FIG. 1 illustrates a chiller-based cooling system.

Examples described in this disclosure relate to autonomous control of supervisory setpoints using artificial intelligence. Certain examples relate to autonomously controlling supervisory setpoints using deep reinforcement learning and machine teaching as applied to, but not limited to, "HVAC-like" systems for smart building operations. The described examples are directed to supervisory control and thus are compute-lite. In addition, unlike some traditional artificial intelligence (AI) systems that take direct and intrusive control, the examples described herein are not disruptive to the existing operations and product lines of entities that may deploy the supervisory control systems and methods described herein.

Often, operators of mechanical systems leave supervisory setpoints unchanged. As a result, states and actions collected from the mechanical system may represent a narrow range of possible values. For example, a flow rate in a manufacturing process may be set to a single fixed value. This limitation to input data prevents a thorough exploration of possible actions when training the model, and as a result, the model may miss optimal solutions. This limitation of the training data is made more acute when there are no simulations, even data-driven simulations, which could be used to simulate flow ranges in the manufacturing process. In order to allow the model to explore a wider range of possible values, values that were fixed or otherwise constrained during data collection may be replaced by delta values that fluctuate throughout training.

As referred to herein, a delta value—also referred to as a delta action—refers to a synthetic value that is generated from a setpoint and an additional state. For example, a delta flow rate may be computed by subtracting a pressure measurement—the additional state—from a flow rate setpoint. In some configurations, the additional state is selected because it provides feedback to the setpoint. Continuing the example, the pressure measurement may be selected as the additional state because it provides feedback about the flow rate. In this example, the flow rate is an absolute value—a value that is obtained directly from a sensor, and which can be used to control a component of the mechanical system.

In some configurations, two delta values are provided as additional inputs to the model. These delta actions may replace the setpoint they are based on. In other configurations, these delta actions are provided to the model in addition to the setpoint they are based on. In general, for each setpoint being controlled, two additional delta actions are provided as inputs to the model. E.g., if there are 12 flow rate setpoints, at least 24 delta actions may be used. Adapting almost any number of setpoints in this way enables these techniques to be generally applied, e.g., they are not restricted to controlling systems within a building, nor to energy management. For example, the cooling of a datacenter with multiple buildings by multiple chiller-based HVAC systems, each with a temperature setpoint, may be optimized by adding two-times as many delta values as the number of temperature setpoints. Other applications, such as manufacturing, may also benefit from training the model to optimized multiple supervisory setpoints.

When the machine learning model is trained with delta values it has no notion of the absolute values the delta values were derived from, and so the model is trained to generate delta actions. Before they can be used to control the mechanical system or train a regression brain, delta actions must be converted back to absolute actions that can be applied to real-world operations. This process may be referred to as "undeltaing the delta". In some configurations, a method of moments technique leverages the underlying physics and thermodynamics of the mechanical system to "undelta" the deltas. Once this has been accomplished, the undelta-ed setpoints and the sets of states used to infer them are used to generate regression brains.

In some configurations, some of the states that are available from the mechanical system, and which were used to train the model, are left out when creating the regression brain. This is done for at least three reasons: to reduce complexity, because it is not necessary to include all of the states to achieve the goal embodied by the reinforcement learning function, and in order to simplify use of regression brains in the field.

States may be selected to reduce complexity by selecting states that represent environmental conditions while omitting states that represent feedback within the mechanical system. For example, return water temperature may be omitted from the regression brain because it encodes feedback.

In order to simplify the use of regression brains in the field, states that are intuitive and readily available to an on-site operator of the mechanical system are selected. In the example of chiller-based HVAC systems, these states may include outside air temperature, humidity (as measured by a wet bulb temperature), and the building demand (in tonnage). Limiting the states to a small number of easily accessible, intuitive values improves the experience of a technician using the regression brain.

After "undeltaing" the delta actions and selecting a subset of states, the regression brain may be constructed. For example, to create a regression brain, a simple regression may be applied to construct a linear function which returns a setpoint action for a subset of environmental states. A regression brain may be created for each setpoint. Regression brains may be linear equations, quadratic equations, or more complicated equations. One benefit of providing a regression brain with a simple mathematical equation is enabling an operator of the mechanical system to compute actions quickly, easily, and repeatedly without having to understand and use a complicated equation. Providing the regression brain as a simple equation has the added benefit of allowing it to be utilized without having to leverage or buy an expensive piece of software—a simple spreadsheet may suffice.

FIG. 1 illustrates a chiller-based cooling system 100, e.g. an HVAC system, that cools building 102. Cooling system 100 is comprised of cooling tower 104, chiller 106, and condenser water pump (CWP) 110 that circulates water between them. Cooling system 100 also includes chilled water pump (CHP) 120 that circulates water from chiller 106 to building 102.

Air handler 130 of building 102 may use chilled water provided by chiller 106 To regulate the temperature of building 102. Load 108 illustrates how much heat is taken out of building 102 by air handler 130 and returned to chiller 106. In some configurations, load 108 may be measured by comparing the temperature of water leaving chiller 106 and chiller return water temperature 124. Load 108 is often measured in tonnage or British Thermal Units (BTUs).

Chilled water setpoint 122 is a supervisory setpoint of cooling system 100 that allows a technician or autonomous system to control the temperature of the water provided by chiller 106 to building 102. A typical chiller-based cooling system may have a range of allowable chilled water setpoints of 40-55 degrees Fahrenheit. In practice, when manually setting the chilled water setpoint 122, technicians tend to err on the side of overcooling, in order to ensure that building temperature remains comfortable.

Analogously, condenser water setpoint 112 is a supervisory setpoint that controls the temperature of water provided by cooling tower 104 to chiller 106. Condenser return water temperature 114 is a measure of the temperature of the water returned from chiller 106 to cooling tower 104.

FIG. 1 also illustrates Outside air temperature 132 and wet bulb temperature 134. Outside air temperature 132 is a measure of the ambient air temperature around cooling system 100. Wet bulb temperature 134 is a measure of humidity of the environment surrounding cooling system 100.

Chiller return water temperature 124, condenser return water temperature 114, outside air temperature 132, and wet bulb temperature 134 are examples of states of cooling system 100. States are typically measured with instruments, meters, or other physical devices, reflecting real-world conditions of cooling system 100.

Figure 2:
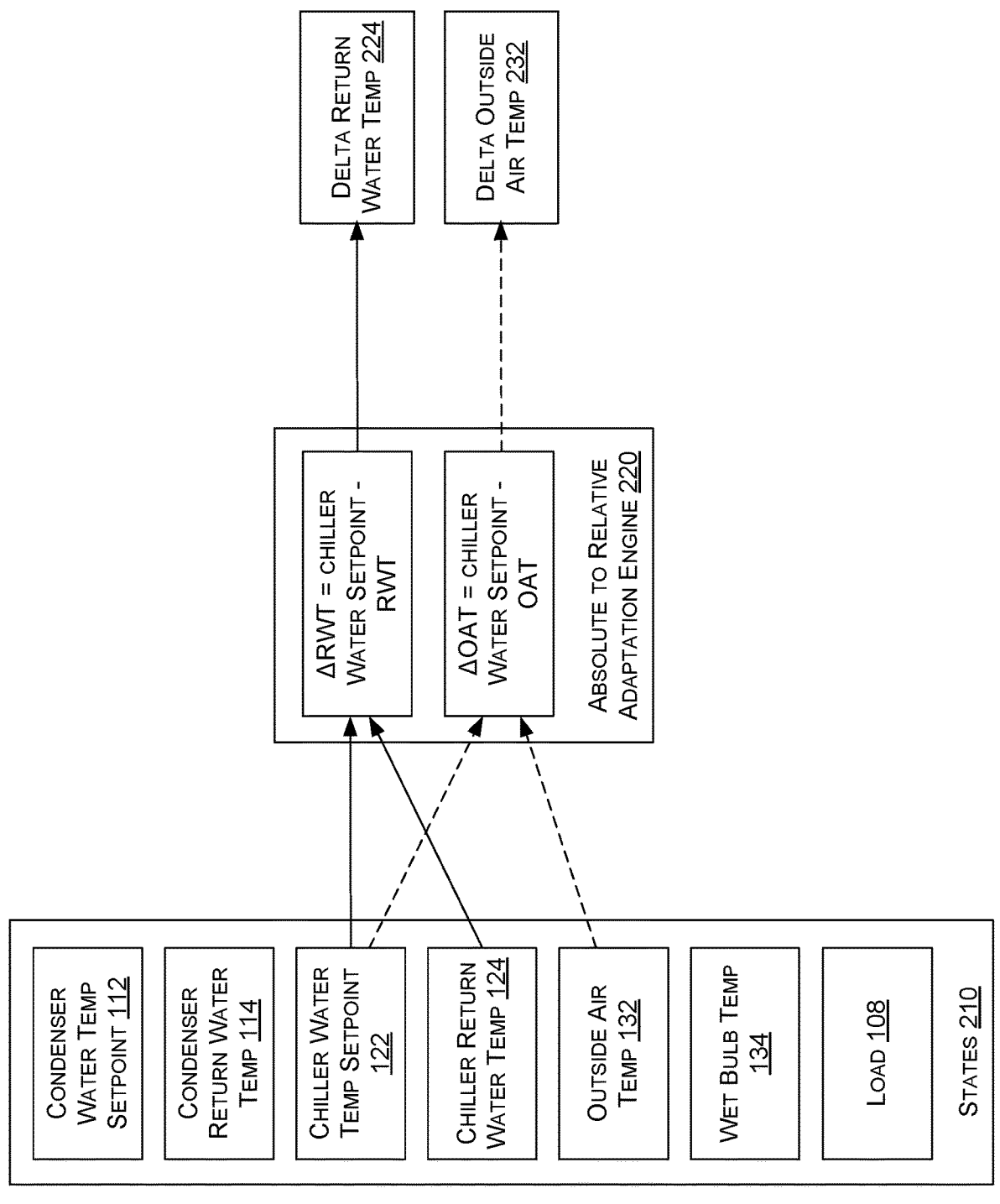
FIG. 2 illustrates computing delta actions from state data collected during operation of the cooling system.

FIG. 2 illustrates computing delta actions from states 210 collected during operation of the cooling system 100. States 210 includes condenser water temperature setpoint 112, condenser return water temperature 114, chiller water temperature setpoint 122, chiller return water temperature 124, outside air temperature 132, wet bulb temperature 134, and load 108, for example.

States 210 may include setpoints—settings that an aspect or component of the cooling system 100 is given or goals that the cooling system 100 is given. An example of a goal setpoint is chilled water setpoint 122. States 210 may also include measured setpoint values—e.g., the actual measured temperature of water leaving chiller 106 that chiller water setpoint 122 controls. The list of states 210 is non-limiting—other states measured from cooling system 100 are similarly contemplated, such as differential pressure measurement within pipes, measures of electricity consumed by cooling tower 104, chiller 106, pumps 110 and 120, and/or air handler 130, and the like.

The amount and timeframe of the collected data may vary based on the type of mechanical system being controlled. For example, when the mechanical system is affected by changes in environmental factors or occupancy levels, the model may benefit from training on data collected over one or more seasons. For instance, a model used to control a chiller-based HVAC system may benefit from a years-worth of data that reflects seasonal weather patterns, occupancy signatures, and other effects on a demand profile.

Training data collected from real-world operation of mechanical systems is limited to the actions that were used while the data was collected. In particular, it is very common for supervisory setpoints, such as temperature setpoints, to be single setpoint operations—i.e., the setpoint is fixed to a single value for all of the training data. As discussed above, a state that is fixed or that exhibits a limited range may constrain the possible setpoint actions that the model may discover.

In order to address this issue, a state or action that is fixed throughout the training data may be replaced with a related "delta" value that fluctuates. These fluctuations increase the range of possible states and setpoint actions that are explored by the model. As a result, more optimal mappings between states and setpoint actions can be learned. For example, if a setpoint is fixed throughout training data, it may be replaced with a "delta" value that is computed by combining the setpoint with a value that fluctuates across the training data.

In the context of a chiller-based HVAC system, a temperature setpoint controlled by a technician may be fixed at a particular value, e.g. 42 degrees Fahrenheit. To compensate for this, a "delta" value may be computed based on the temperature setpoint and some other state, e.g. by subtracting an outside air temperature from the temperature setpoint. Outside air temperature fluctuates, and so "temperature setpoint—outside air temperature" will also fluctuate throughout the training data. This "delta" value may be referred to herein as "ΔOAT". Adapting existing states in this way enables training the model without a simulator, simplifying the process and expanding the reach of the disclosed embodiments.

In some configurations, a fixed or limited range state is compensated for with two delta values. In the example of an HVAC system that utilizes a chiller, a delta return water temperature (ΔRWT) value is defined as:

$$\Delta RWT=\text{chiller water setpoint}-\text{return water temperature}$$

Return water temperature is a type of feedback that indicates the heating load from the building, i.e., how much heat has to be removed. This informs how much chilled water needs to be provided as efficiently as possible.

Delta outside air temperature ($\Delta$OAT) is defined as:

$$\Delta OAT=\text{chiller water setpoint}-\text{outside air temperature}.$$

$\Delta$OAT represents the difference between outside air temperature and the temperature of water that is entering the building, indicating an environmental effect on the load.

Each of these delta values encodes feedback from the mechanical system, which incorporates feedback into the chiller water setpoint action. Specifically, return water temperature encodes information from environmental states and everything that goes on within the building—occupancy, global demand, what is and isn't running, time of day, etc. In essence, when training the model, there is redundancy in states—e.g., $\Delta$OAT and $\Delta$RWT overlap some of the information they encode. Neural networks are known to be robust in the face of overparameterization, and so neural networks still perform well when multiple inputs encode the same information.

In contrast, linear model regression brains are not effective when dealing with overparameterization. This is another reason that $\Delta$RWT and other feedback states are not included as parameters when constructing a regression brain, as discussed below in conjunction with FIG. 6. Instead, when training a regression brain, states that are not overparameterized are selected—i.e., states that do not both encode the same information. For instance, environmental states that are being measured, such as outside air temperature and wet bulb temperature, do not encode the same information, and so both of these states may be selected when training a regression brain. An incidental benefit of omitting overparameterized states from the regression brain is that is simplifies use of the regression brain by the operator.

Absolute to relative adaptation engine 220 generates delta values 224 and 232 from two or more of entries included in states 210. For example, absolute to relative adaptation engine 220 may apply an equation to compute $\Delta$RWT from a chilled water temperature setpoint 122 and a return water temperature 124. As illustrated, $\Delta$RWT=chilled water temperature setpoint 122—chiller return water temperature 124. Chiller return water temperature 124 naturally varies based on load 108 of building 102. Therefore, even if chiller water temperature setpoint 122 remains fixed while collecting states 210, incorporating chiller return water temperature 124 produces a delta return water temperature 224 that varies across the training data. This variation allows a more complete exploration of the possible outputs of a machine learning model.

Similarly, absolute relative adaptation engine 220 combines chiller water temperature setpoint 122 and outside air temperature 132 to generate delta outside air temperature 232. As illustrated, $\Delta$OAT=chilled water temperature setpoint 122—outside air temperature 132. Since outside air temperature 132 also tends to vary over time, delta outside air temperature 232 will tend to vary even if chilled water temperature setpoint 122 remains fixed.

Figure 3:
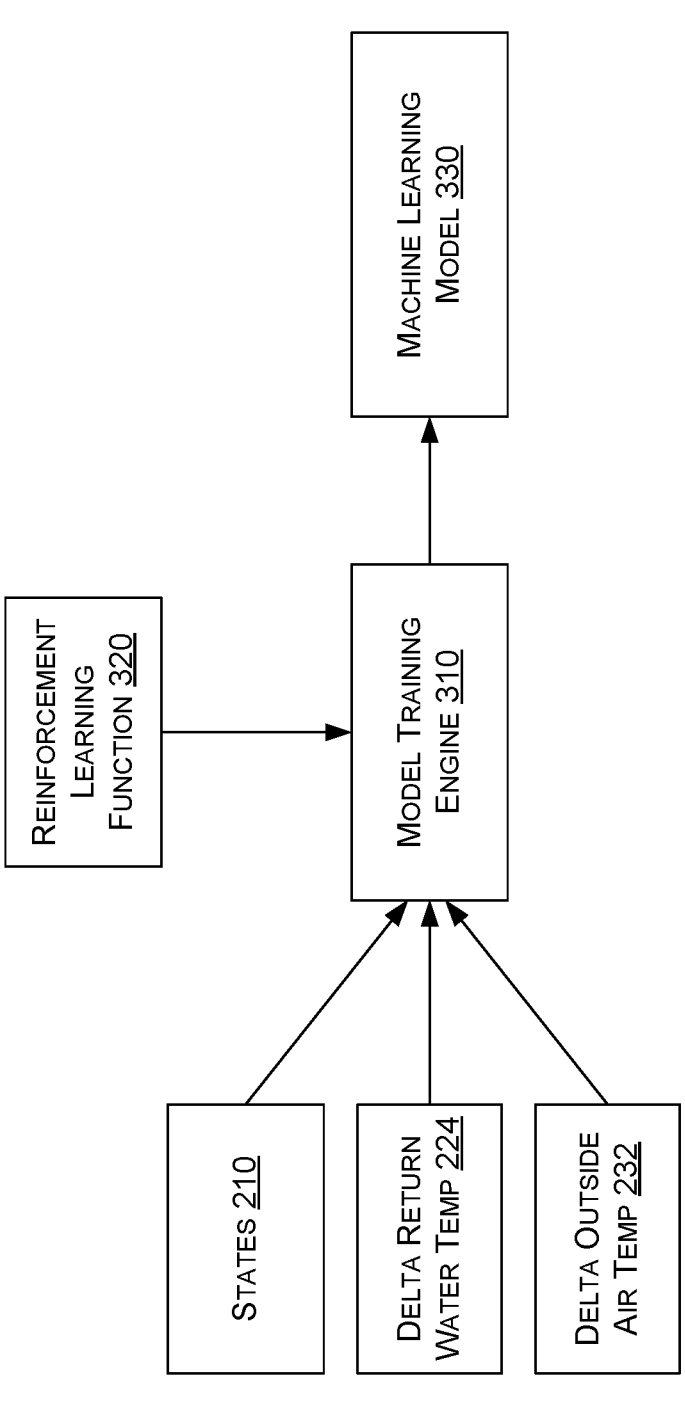
FIG. 3 illustrates training a machine learning model using state data and delta actions.

FIG. 3 illustrates training a machine learning model using states 210 and delta actions 224 and 232. Model training engine 310 trains machine learning model 330 using reinforcement learning function 320. Specifically, one or more of states 210, delta return water temperature 224, and delta outside air temperature 232 are provided as inputs to machine learning model 330 during training. If additional setpoints are being controlled, then additional delta actions may be provided. Reinforcement learning function 320 may train machine learning model 330 to generate a delta action based on a goal, such as minimizing power consumption required to satisfy the load 108. In some configurations, since machine learning model 330 has not been provided with absolute set points it cannot be trained to produce absolute setpoints, but instead is trained to produce delta setpoint actions which are not immediately usable to control cooling system 100.

Figure 4:
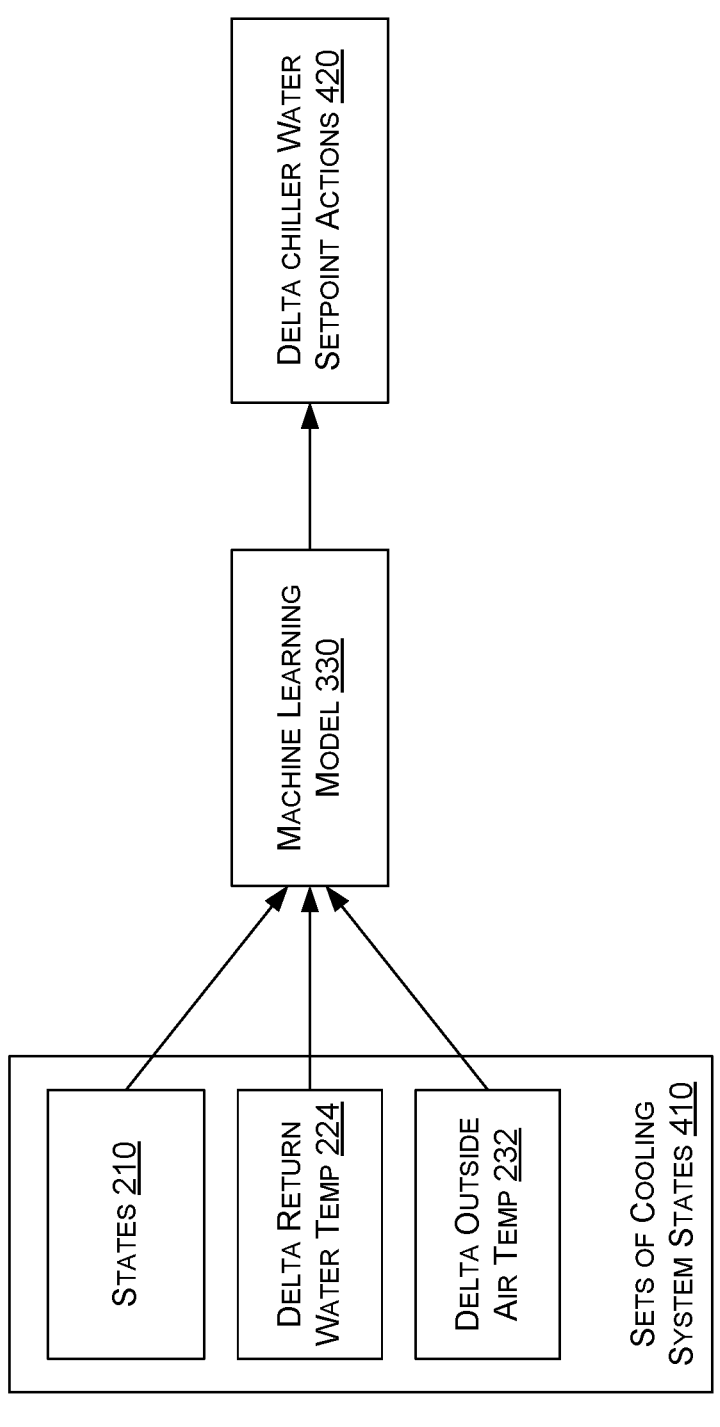
FIG. 4 illustrates using the trained machine learning model to generate delta action predictions.

FIG. 4 illustrates using the trained machine learning model 330 to generate delta action predictions 420. Specifically, machine learning model 330 is used to infer delta chilled water setpoint actions 420 from sets of cooling system states 410.

In some configurations, machine learning model 330 is used to generate a regression brain that may be employed on-site to set supervisory setpoints of cooling system 100. In order to generate a regression brain, a corpus of sets of cooling system state data 410 are used to infer corresponding delta chilled water setpoint actions 420. As discussed above in conjunction with FIG. 3, the delta chilled water setpoint actions 420 are not immediately usable to control an aspect of cooling system 100.

Figure 5:
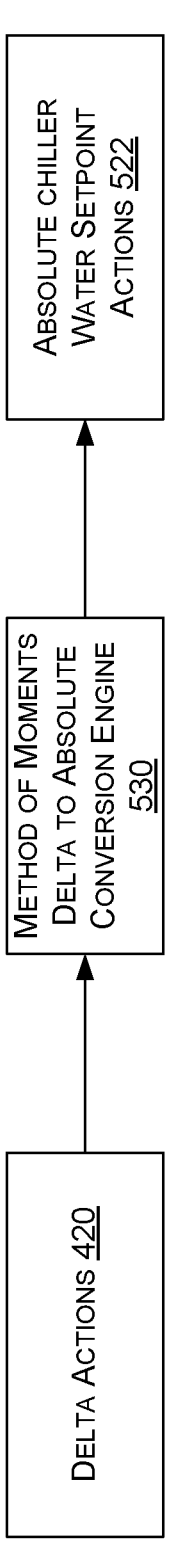
FIG. 5 illustrates using a method of moments technique to convert delta actions into ab solute actions.

FIG. 5 illustrates using a method of moments technique to convert delta actions 420 into absolute actions 522. The trained model 330 is a characterization of the states and actions 210. A subset of the actions generated by trained model 330 are delta actions 420, e.g., $\Delta$OAT. These delta actions 420 are typically the result of some computation, such as "temperature setpoint—outside air temperature", and as such do not represent a real-world value that can be acted upon. For example, if a temperature setpoint has been replaced with $\Delta$OAT, the model will learn to predict $\Delta$OAT values that best satisfy the reinforcement learning function. But it is meaningless and potentially harmful to tell an HVAC system to set a temperature setpoint to a $\Delta$OAT value—the HVAC system instead understands absolute setpoint temperature values.

As such, before they can be used to control the mechanical system, delta actions must be converted back to absolute actions. This process may be referred to as "undeltaing the action". In some configurations, the method of moments technique leverages the underlying physics and thermodynamics of the system to "undelta" the deltas. In the example of a chiller-based HVAC system, method of moments balances $\Delta$RWT and $\Delta$OAT, arriving at the following expression for converting a delta action into an absolute action:

$$\text{Recommended setpoint}=\Delta RWT*\text{ (setpoint action range)}/(\Delta RWT+\Delta OAT)+40$$

As discussed below in conjunction with FIG. 6, a regression brain may be generated using a corpus of delta actions that have been converted into absolute actions with this equation. As discussed above, the regression brain may be deployed to the mechanical system in order to set supervisory setpoints. For example, the regression brain may map states, such as outside air temperature, load, pump pressure, etc., to actions usable to modify supervisory setpoints. In this example, the constant term "40" is particular to HVAC systems. Specifically, many HVAC systems allow a chiller water temperature setpoint to be set as low as 40. Other types of systems may contemplate other constant values.

Figure 6A:
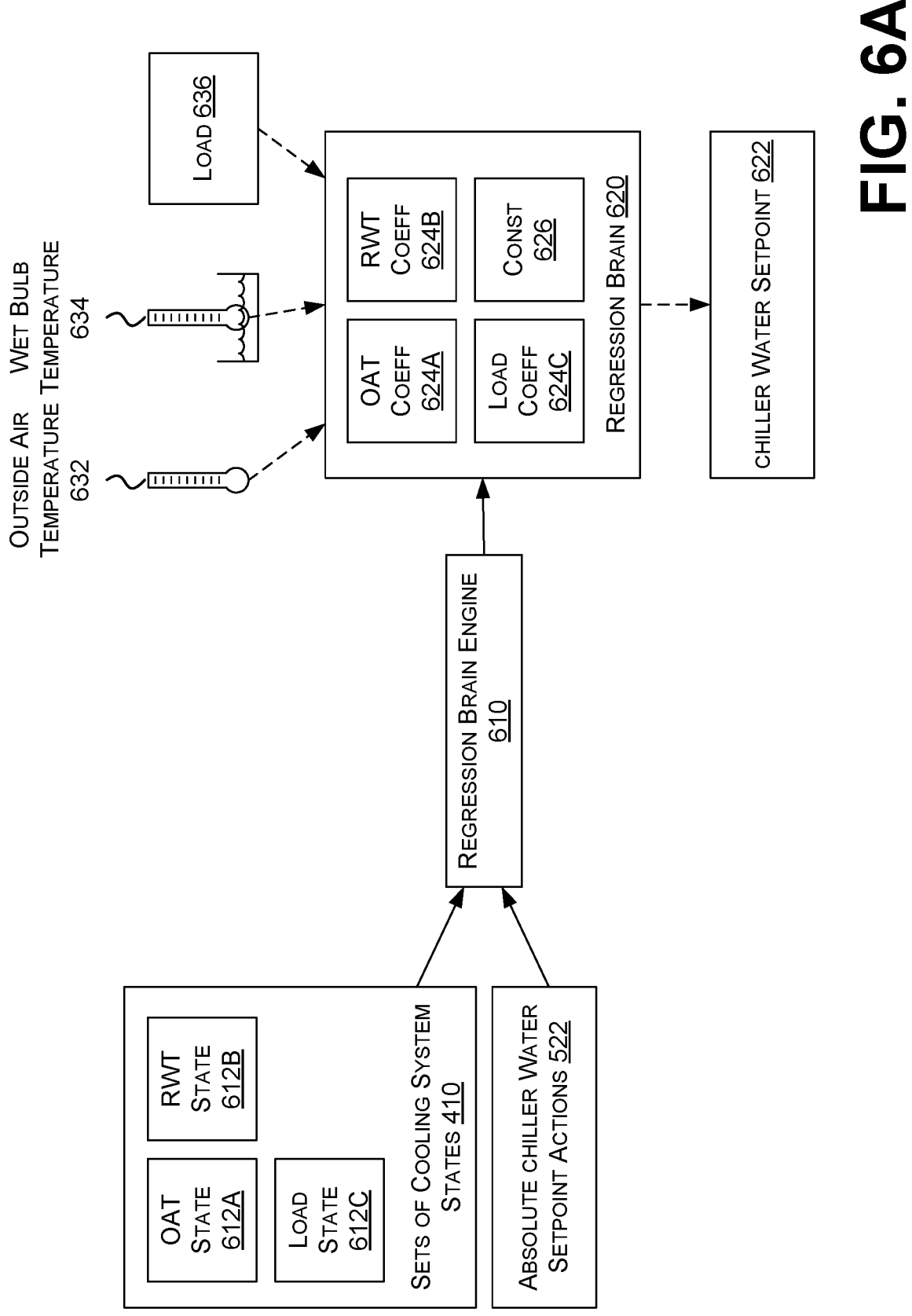
FIG. 6A illustrates generating a regression brain to control a chiller water temperature setpoint based on state data and absolute setpoint actions.

FIG. 6A illustrates generating a regression brain 620 based on sets of cooling system states 410 and corresponding absolute chiller water setpoint actions 522. In some configurations, the trained model maps states to actions. However, it is not always practical or even possible to deploy the trained model into the field. Inadequate computing power, an inability to integrate with existing mechanical systems, unacceptably high computational latency, and other limitations may prevent the trained model from being deployed on-premise to control a mechanical system. Instead, the trained model may be used to create a "regression brain"—e.g., a linear equation that, given the current state of the mechanical system, returns an action with which to control the system.

In some configurations, each of the sets of cooling system states 410 was used to infer, with machine learning model 330, one of the delta actions 420. This delta action was then "de-delta-ed" with a method of moments to produce one of the absolute chiller water setpoint actions 522. Regression brain engine 610 may perform a regression analysis on sets of cooling system states 410 and corresponding absolute chiller water setpoint actions 522 to determine regression brain 620 that, for a given set of states, yields a chiller water setpoint action 622.

In some configurations, not all of the states stored in sets of cooling system states 410 are used to generate the regression brain 620. For example, states may be omitted due to redundancy with other states or for representing the same information that is already encoded in other states— also referred to as overparameterization. In one configuration, states that are not obtained directly from a sensor or other measuring device are excluded when performing the regression analysis.

As illustrated, select states 612 are used to determine regression brain 620. Specifically, Outside Air Temperature state 612A, Return Water Temperature state 612B, and Load state 612C are analyzed to generate a regression brain 620 with Outside Air Temperature coefficient 624A, Return Water Temperature coefficient 624B, load coefficient 624C, and constant 626. In this context, Return Water Temperature state 612B reflects the chiller return water temperature 124. Other states that were used to train machine learning model 330, such as condenser return water temperature 114, are not included when generating regression brain 620.

One real world example of the resulting regression equation of regression brain 620 is "2005.6018066-0.181145571 * state.OAT—0.015137211 * state.RWT—0.005379316 * state.Load.", where 2005.6018066 is constant 626, −0.181145571 is Outside Air Temperature coefficient 624A, −0.015137211 is Return Water Temperature coefficient 624B, and −0.005379316 is Load coefficient 624C. And where "state.OAT" refers to an individual outside air temperature 132, often sampled in real-time from a sensor near mechanical system 100. Similarly, "state.RWT" refers to a measure of return water temperature 124, and state.Load refers to a measure of load 108.

In some configurations, in order to compute a setpoint action 622, regression brain 620 multiplies each coefficient 624 by a corresponding input parameter, adds the results, and optionally adds constant value 626. The resulting value is an absolute setpoint action 622 that may be used to configure an aspect of cooling system 100.

For example, outside air temperature 632 is a real-world reading of the temperature around cooling system 100. Outside air temperature 632 is multiplied by OAT coefficient 624A. Similarly, return water temperature 634 is multiplied by return water coefficient 624B and load 636 is multiplied by load coefficient 624C. The result may be added to constant 626, and the final value is a setpoint action that can control an aspect of cooling device 100 such as chiller water setpoint 622.

Setting chiller water temperature setpoint 122 based on chiller return water temperature 124 and outside air temperature 132 is one example of using an action generated by a regression brain to control some aspect of a mechanical system. Other setpoints are similarly contemplated. For example, condenser water temperature setpoint 112 may similarly be controlled by an action that is derived from ΔWBT and condenser return water temperature 114. Specifically, ΔWBT=condenser water temperature setpoint 112—wet bulb temperature 134. When training the model, condenser water temperature setpoint 112 may be replaced or augmented with ΔWBT, which fluctuates, as a model input. And accordingly, one example method of moments computation to "undelta the delta" is "Recommended setpoint=$\Delta RWT_{condenser}$ * (setpoint action range)/ ($\Delta RWT_{condenser}$+ΔWBT)+40". These same techniques may be expanded for use on other mechanical systems, such as manufacturing processes.

Figure 6B:
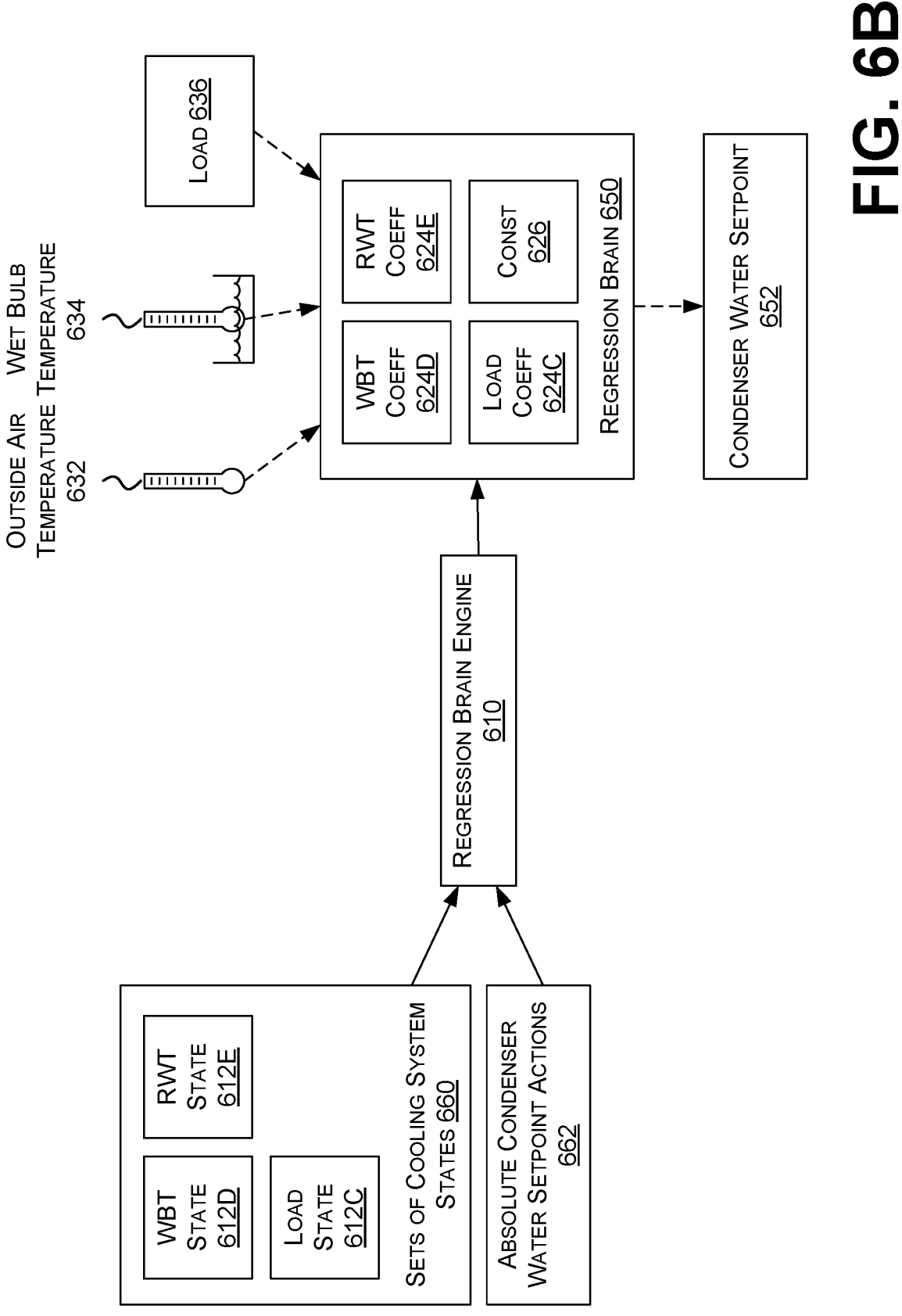
FIG. 6B illustrates generating a regression brain to control a condenser water temperature setpoint based on state data and absolute setpoint actions.

FIG. 6B illustrates generating a regression brain 650 based on sets of cooling system states 660 and corresponding absolute chillers water setpoint actions 662. Sets of cooling systems states 660 are similar to sets of cooling system states 410, except they reflect environmental states that are relevant to condenser water setpoint 112. Similarly, absolute condenser water setpoint actions 662 are similar to absolute chiller water setpoint actions 522, except they were inferred from a machine learning model that was trained to optimize the performance of condenser water temperature setpoint 112 instead of chiller water temperature setpoint 122.

Regression brain engine 610 may perform a regression analysis on sets of cooling system states 660 and corresponding absolute condenser water setpoint actions 662 to determine regression brain 650 that, for a given set of states, yields a condenser water setpoint action 652.

As illustrated, select states 612 are used to determine regression brain 650. Specifically, Wet Bulb Temperature state 612D, Return Water Temperature state 612E, and Load state 612C are analyzed to generate regression brain 650 with Wet Bulb Temperature coefficient 624D, Return Water Temperature coefficient 624E, load coefficient 624C, and constant 626. In this context, Return Water Temperature state 612E reflects the condenser return water temperature 114. Other states that may have been used to train the machine learning model that inferred absolute condenser water setpoint actions 662 are not included when generating regression brain 650.

Figure 7:
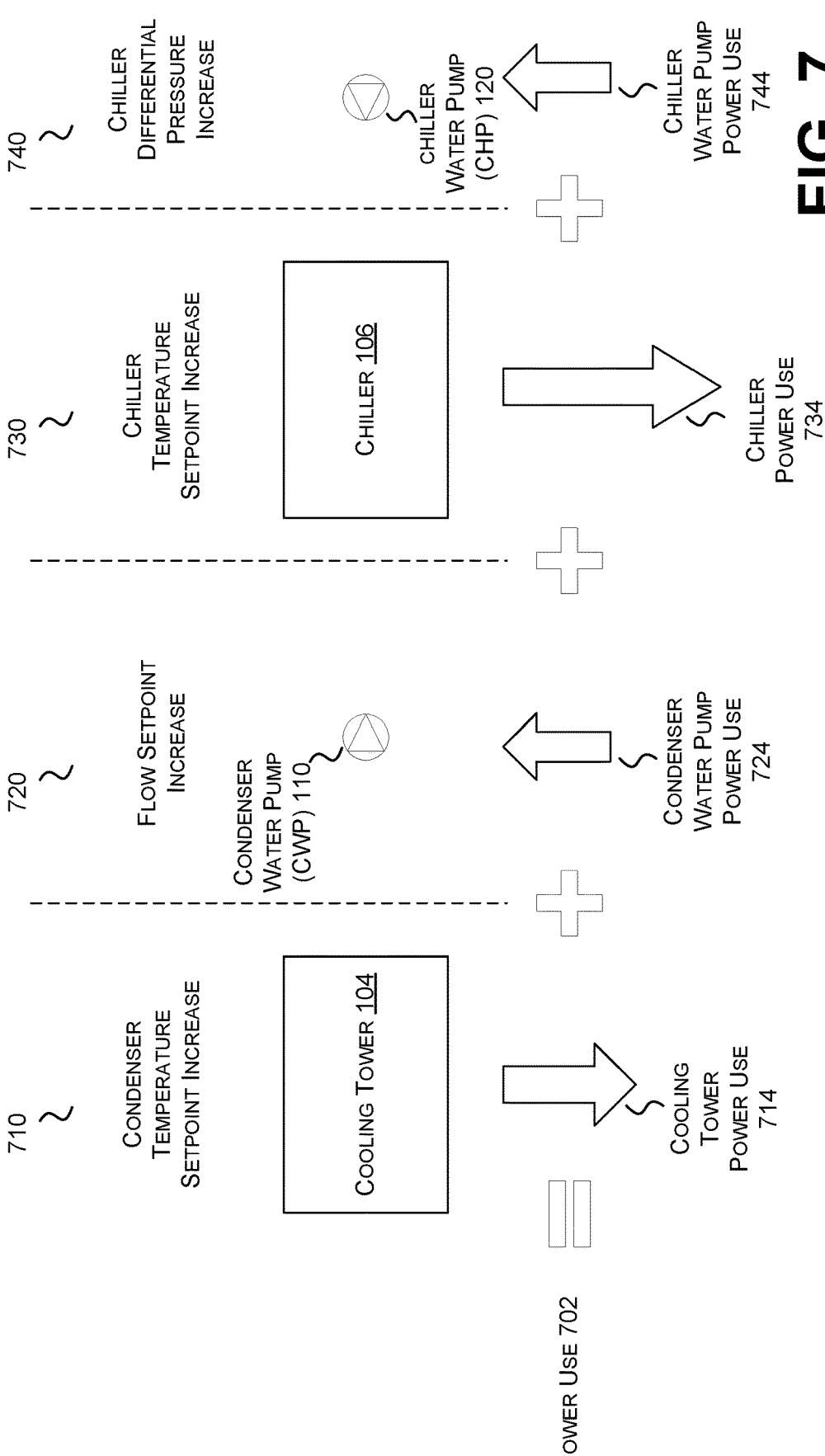
FIG. 7 illustrates changes in the power usage by the cooling system 100 in accordance with one example.

FIG. 7 shows changes in the power usage by the cooling system 100 in accordance with one example. As explained earlier, the various components of the cooling system 100 may consume power based on the cooling load 108 being serviced by the cooling system 100. The power usage 702 may be based on the recommended setpoints 710, 720, 730, 740 by regression brain 620. Portion 710 corresponds to any increases or decreases in the power usage by the cooling tower (e.g., cooling tower 104). In this example, arrow 714 shows that the power usage by the cooling tower 104 is decreased when the condenser water temperature setpoint (CDW SWS) is increased. Portion 720 corresponds to the power usage by the cooling pump (e.g., CWP 110). In this example, arrow 724 shows that the power usage by the cooling pump is increased when the chilled water flow GPM STPT is increased. Portion 730 corresponds to the power usage by the chiller (e.g., chiller 106). In this example, arrow 734 shows that the power usage by chiller 106 is decreased as a result in the increase of the chiller water temperature setpoint (CHW SWS). Portion 740 corresponds to the power usage by the chilled water pressure differential. In this example, arrow 744 shows that the power usage by the chilled water pump (e.g., CHP 120) is increased when the differential pressure (DPSP) is increased. These changes in the power usage by the various components of the cooling system 100, however, result in a decrease in the net power usage of the cooling system 100 while still meeting the cooling load 108 requirements. Thus, the predicted setpoints by the autonomous supervisory control system result in efficiency gains.

Figure 8:
FIG. 8 illustrates conceptually some of the terms found in the method of moments setpoint expression.

FIG. 8 illustrates conceptually some of the terms found in the method of moments setpoint expression discussed above in conjunction with FIG. 5. Generally speaking, a moment refers to a torque applied to a lever arm. Balance point 802 illustrates that the method of moments technique is based on balance between the ΔOAT 810 side and the ΔRWT 812 side. In some configurations, the ΔRWT 812 side is an example of a feedback state that reflects changes to the ΔOAT 810 side. Chilled water setpoint range 814, which for example may be 40°-55° for some cooling systems 100, represents the length of the lever arm. In this example, the ΔOAT 810 side includes a constant value of 40°, which is one example of a value that may be chosen for cooling system 100, but which may vary in other mechanical systems. The depictions in FIG. 8 are visual abstractions to aid intuition and understanding—method of moments does not literally use a scale to balance out the indicated values.

Figure 9:
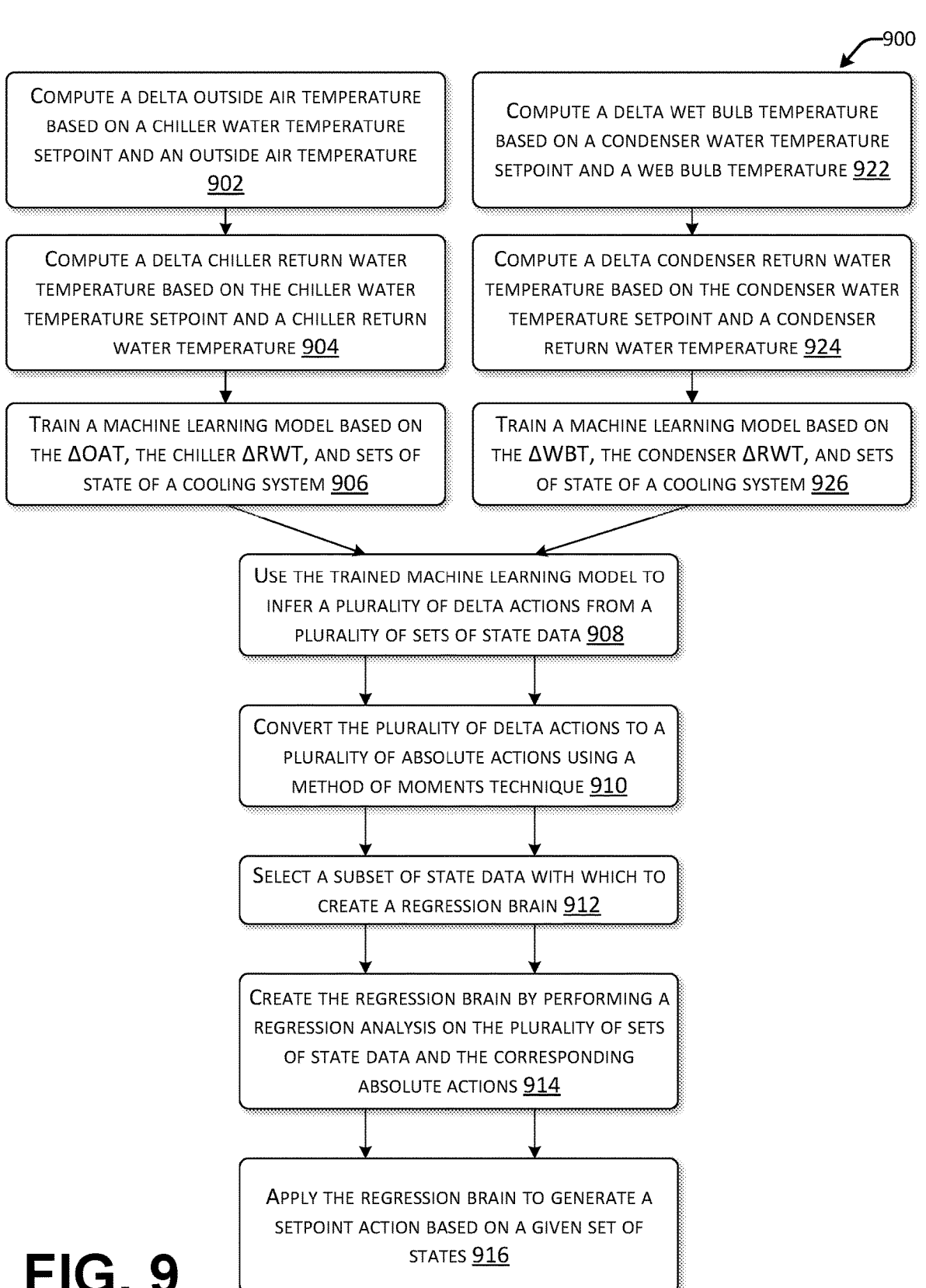
FIG. 9 is a flow diagram of an example method for using a machine learning model to train a regression brain that is used to control a mechanical system.

Turning now to FIG. 9, aspects of a routine for using a machine learning model to train a regression brain that is used to control a mechanical system is shown and described. For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

With reference to FIG. 9, routine 900 illustrates two parallel routines for using an AI agent to generate actions that control setpoints on mechanical system 100. Operations 902, 904, and 906, plus operations 908-916, illustrate generating a chiller water temperature setpoint action 622. Similarly, operation 922, 924, and 926, plus operations 908-916, illustrate generating a condenser water temperature setpoint action 652. These routines may be performed independently of one another, or in parallel. In some configurations, both routines are used to set both the chiller water temperature setpoint 122 and the condenser water temperature setpoint 112. At operation 902, a delta outside air temperature 232 is computed based on a chilled water temperature setpoint 122 and an outside air temperature 132. At operation 922, a delta wet bulb temperature is computed based on a condenser water temperature setpoint 112 and a wet bulb temperature 134.

Next at operation 904, a delta chiller return water temperature 224 is computed based on chilled water temperature setpoint 122 and return water temperature 124. At operation 924, a delta condenser return water temperature is computed based on the condenser water temperature setpoint 112 and the condenser return water temperature 114.

Next at operation 906, machine learning model 330 is trained based on the delta outside air temperature 232, the chiller delta return water temperature 224, and sets of states 210 of cooling system 100. At operation 926, a machine learning model is trained based on the delta wet bulb temperature, the condenser delta return water temperature, and sets of state of cooling system 100.

Next at operation 908, the trained machine learning model is used to infer a plurality of delta actions from a plurality of sets of state of data.

Next at operation 910, the plurality of delta actions are converted to a plurality of absolute actions using a method of moments technique.

Next at operation 912, a subset of state data is selected with which to create a regression brain.

Next at operation 914, the regression brain is created by performing a regression analysis on the plurality of sets of state data and the corresponding absolute actions.

Routine 900 then proceeds to operation 916, where the regression brain is applied to generate a setpoint action usable to set supervisory setpoint based on a given set of states.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 900 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it should be appreciated that the operations of the routine 900 may be also implemented in many other ways. For example, the routine 900 may be implemented, at least in part, by a processor of another remote computer or a local circuit. In addition, one or more of the operations of the routine 900 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

Figure 10:
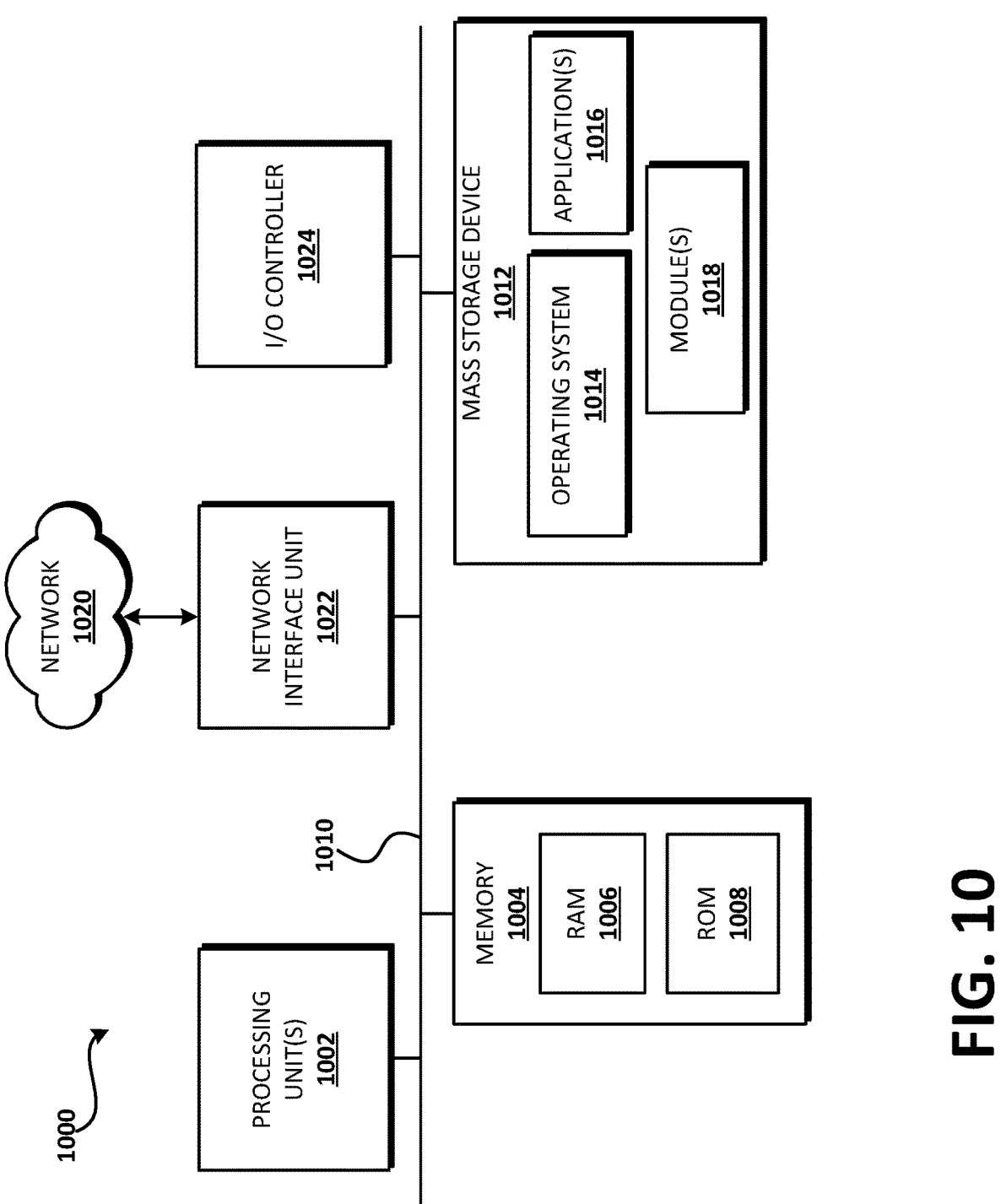
FIG. 10 is a computer architecture diagram illustrating an illustrative computer hardware and software architecture for a computing system capable of implementing aspects of the techniques and technologies presented herein.

FIG. 10 shows additional details of an example computer architecture 1000 for a device, such as a computer or a server configured as part of the systems described herein, capable of executing computer instructions (e.g., a module or a program component described herein). The computer architecture 1000 illustrated in FIG. 10 includes processing unit(s) 1002, a system memory 1004, including a random-access memory 1006 ("RAM") and a read-only memory ("ROM") 1008, and a system bus 1010 that couples the memory 1004 to the processing unit(s) 1002.

Processing unit(s), such as processing unit(s) 1002, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 1000, such as during startup, is stored in the ROM 1008. The computer architecture 1000 further includes a mass storage device 1012 for storing an operating system 1014, application(s) 1016, modules 1018, and other data described herein.

The mass storage device 1012 is connected to processing unit(s) 1002 through a mass storage controller connected to the bus 1010. The mass storage device 1012 and its associated computer-readable media provide non-volatile storage for the computer architecture 1000. Although the description of computer-readable media contained herein refers to a mass storage device, it should be appreciated by those skilled in the art that computer-readable media can be any available computer-readable storage media or communication media that can be accessed by the computer architecture 1000.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 1000 may operate in a networked environment using logical connections to remote computers through the network 1020. The computer architecture 1000 may connect to the network 1020 through a network interface unit 1022 connected to the bus 1010. The computer architecture 1000 also may include an input/output controller 1024 for receiving and processing input from a number of other devices, including a keyboard, mouse, touch, or electronic stylus or pen. Similarly, the input/output controller 1024 may provide output to a display screen, a printer, or other type of output device.

It should be appreciated that the software components described herein may, when loaded into the processing unit(s) 1002 and executed, transform the processing unit(s) 1002 and the overall computer architecture 1000 from a general-purpose computing system into a special-purpose computing system customized to facilitate the functionality presented herein. The processing unit(s) 1002 may be constructed from any number of transistors or other discrete circuit elements, which may individually or collectively assume any number of states. More specifically, the processing unit(s) 1002 may operate as a finite-state machine, in response to executable instructions contained within the software modules disclosed herein. These computer-executable instructions may transform the processing unit(s) 1002 by specifying how the processing unit(s) 1002 transition between states, thereby transforming the transistors or other discrete hardware elements constituting the processing unit(s) 1002.

FIG. 11 depicts an illustrative distributed computing environment 1100 capable of executing the software components described herein. Thus, the distributed computing environment 1100 illustrated in FIG. 11 can be utilized to execute any aspects of the software components presented herein. For example, the distributed computing environment 1100 can be utilized to execute aspects of the software components described herein.

Accordingly, the distributed computing environment 1100 can include a computing environment 1102 operating on, in communication with, or as part of the network 1104. The network 1104 can include various access networks. One or more client devices 1106A-1106N (hereinafter referred to collectively and/or generically as "clients 1106" and also referred to herein as computing devices 1106) can communicate with the computing environment 1102 via the network 1104. In one illustrated configuration, the clients 1106 include a computing device 1106A such as a laptop computer, a desktop computer, or other computing device; a slate or tablet computing device ("tablet computing device") 1106B; a mobile computing device 1106C such as a mobile telephone, a smart phone, or other mobile computing device; a server computer 1106D; and/or other devices 1106N. It should be understood that any number of clients 1106 can communicate with the computing environment 1102.

In various examples, the computing environment 1102 includes servers 1108, data storage 1110, and one or more network interfaces 1112. The servers 1108 can host various services, virtual machines, portals, and/or other resources. In the illustrated configuration, the servers 1108 host virtual machines 1114, Web portals 1116, mailbox services 1118, storage services 1120, and/or, social networking services 1122. As shown in FIG. 11 the servers 1108 also can host other services, applications, portals, and/or other resources ("other resources") 1124.

As mentioned above, the computing environment 1102 can include the data storage 1110. According to various implementations, the functionality of the data storage 1110 is provided by one or more databases operating on, or in communication with, the network 1104. The functionality of the data storage 1110 also can be provided by one or more servers configured to host data for the computing environment 1102. The data storage 1110 can include, host, or provide one or more real or virtual datastores 1126A-1126N (hereinafter referred to collectively and/or generically as "datastores 1126"). The datastores 1126 are configured to host data used or created by the servers 1108 and/or other data. That is, the datastores 1126 also can host or store web page documents, word documents, presentation documents, data structures, algorithms for execution by a recommendation engine, and/or other data utilized by any application program. Aspects of the datastores 1126 may be associated with a service for storing files.

The computing environment 1102 can communicate with, or be accessed by, the network interfaces 1112. The network interfaces 1112 can include various types of network hardware and software for supporting communications between two or more computing devices including, but not limited to, the computing devices and the servers. It should be appreciated that the network interfaces 1112 also may be utilized to connect to other types of networks and/or computer systems.

It should be understood that the distributed computing environment 1100 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 1100 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 1100 to utilize the functionality described herein for providing the techniques disclosed herein, among other aspects.

The present disclosure is supplemented by the following example clauses.

Example 1: A method comprising: computing a delta outside air temperature based on a chilled water temperature setpoint of a cooling system and an outside air temperature; computing a delta return water temperature based on the chilled water temperature setpoint and a return water temperature of the cooling system; training a machine learning model based on the delta outside air temperature, the delta return water temperature, and a state of the cooling system; using the machine learning model to infer a plurality of delta actions from a plurality of sets of cooling system state data; converting the plurality of delta actions to a plurality of absolute actions; and performing a regression analysis on the plurality of sets of cooling system state data and the corresponding plurality of absolute actions to generate a function that maps individual states of the cooling system to individual absolute actions; wherein an absolute action returned by the function sets the chilled water temperature setpoint of the cooling system.

Example 2: The method of example 1, wherein the delta outside air temperature is computed by subtracting the outside air temperature from the chilled water temperature setpoint and wherein the delta return water temperature is computed by subtracting the return water temperature from the chilled water temperature setpoint.

Example 3: The method of example 1, wherein the state of the cooling system is one of a plurality of states of the cooling system, and wherein the chilled water temperature setpoint, the outside air temperature, the return water temperature, and the state of the cooling system are obtained from cooling system state data collected while the cooling system is running.

Example 4: The method of example 1, wherein the state of the cooling system comprises a load of a building being cooled by the cooling system, a wet bulb temperature, the outside air temperature, a condenser return water temperature, a condenser water temperature setpoint, a chiller flow setpoint, or a condenser flow setpoint.

Example 5: The method of example 4, further comprising: using the machine learning model to infer a second plurality of delta actions from the plurality of machine learning model inputs for controlling a condenser temperature setpoint, a chiller flow setpoint, or a condenser flow setpoint.

Example 6: The method of example 3, wherein the plurality of machine learning model inputs are obtained from the cooling system state data collected while the cooling system is running.

Example 7: The method of example 1, wherein each of the plurality of delta actions are converted to absolute actions using a method of moments technique.

Example 8: The method of example 7, wherein the method of moments technique converts each of the plurality of delta actions to absolute chilled water temperature setpoint actions by multiplying the delta return water temperature by a setpoint action range, dividing by a sum of the delta return water temperature and the delta outside air temperature, and adding a constant temperature.

Example 9: A computing device comprising: one or more processors; a memory in communication with the one or more processors, the memory having computer-readable instructions stored thereupon which, when executed by the one or more processors, cause the computing device to: compute a relative value by subtracting a state of a mechanical system from a setpoint value of the mechanical system; compute a relative feedback value by subtracting, from the setpoint value, a feedback state that corresponds to the state; train a machine learning model based on the relative value, the relative feedback value, and a state of one of a plurality of sets of states collected during operation of the mechanical system; using the machine learning model, infer a plurality of delta actions from at least some of the plurality of sets of state data of the mechanical system; convert the plurality of delta actions to a plurality of absolute actions; and perform a regression analysis on the at least some of the plurality of sets of state data and the corresponding plurality of absolute actions to generate a function 620 that maps individual states of the mechanical system to individual absolute actions; wherein an absolute action returned by the function sets the setpoint of the mechanical system.

Example 10: The computing device of example 9, wherein the setpoint value comprises a flow rate or a temperature.

Example 11: The computing device of example 9, wherein the relative feedback value reflects changes to the mechanical system caused by a change to the setpoint value.

Example 12: The computing device of example 9, wherein the relative value comprises a delta outside air temperature, wherein the relative feedback value comprises a delta return water temperature.

Example 13: The computing device of example 9, wherein the machine learning model is trained with a reinforcement learning function.

Example 14: The computing device of example 9, wherein the machine learning model is trained remotely from a computing device that employs the function to generate the absolute action.

Example 15: The computing device of example 9, wherein additional regression analyses are performed to generate additional functions that map individual states of the mechanical system to individual absolute actions.

Example 16: The computing device of example 9, wherein the individual states that are selected to be parameters for the function do not include all of the states of the sets of state data, and wherein the individual states that are selected to be parameters for the function do not over parameterize information about the mechanical system.

Example 17: A computer-readable storage medium comprising instructions that, when executed by a processor, cause the processor to: capture a set of states of a cooling system; invoke a function with a subset of the set of states of the cooling system, wherein the function is generated by: computing a delta outside air temperature based on a chilled water temperature setpoint of a cooling system and an outside air temperature; computing a delta return water temperature based on the chilled water temperature setpoint and a return water temperature of the cooling system; training a machine learning model based on the delta outside air temperature, the delta return water temperature, and a state of one of a plurality of sets of states collected during operation of the cooling system; use the machine learning model to infer a plurality of delta actions from a plurality of sets of cooling system state data; convert the plurality of delta actions to a plurality of absolute actions; and perform a regression analysis on the plurality of sets of cooling system state data and the corresponding plurality of absolute actions to generate the function 620 that maps individual states of the cooling system to individual absolute actions; and using a return value of the function to set a setpoint of the cooler system.

Example 18: The computer-readable storage medium of example 17, the function is one of a plurality of functions, each of which evaluates to a different setpoint of the cooling system.

Example 19: The computer-readable storage medium of example 17, wherein an individual state originates from sensor data, and wherein an individual action is usable to set a supervisory setpoint of the cooling system.

Example 20: The computer-readable storage medium of example 19, wherein the supervisory setpoint of the cooling system includes a condenser water setpoint, a condenser water pump flow rate, a chilled water setpoint, or a chilled water pump flow rate.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method comprising:

setting a chilled water temperature setpoint of a cooling system based on an absolute action, wherein the absolute action is obtained from a function that maps individual states of the cooling system to individual absolute actions, wherein the function is generated based on a regression analysis of a plurality of sets of cooling system state data and a corresponding plurality of absolute actions, wherein the plurality of absolute actions is obtained by converting a plurality of delta actions, wherein the plurality of delta actions are inferred by a machine learning model from the plurality of sets of cooling system state data, and wherein the machine learning model is trained by:

computing a delta outside air temperature based on a chilled water temperature setpoint of the cooling system and an outside air temperature, computing a delta return water temperature based on the chilled water temperature setpoint and a return water temperature of the cooling system, and training the machine learning model based on the delta outside air temperature, the delta return water temperature, and a state of the cooling system.

2. The method of claim 1, wherein the delta outside air temperature is computed by subtracting the outside air temperature from the chilled water temperature setpoint and wherein the delta return water temperature is computed by subtracting the return water temperature from the chilled water temperature setpoint.

3. The method of claim 1, wherein the state of the cooling system is one of a plurality of states of the cooling system, and wherein the chilled water temperature setpoint, the outside air temperature, the return water temperature, and the state of the cooling system are obtained from cooling system state data collected while the cooling system is running.

4. The method of claim 1, wherein the state of the cooling system comprises a load of a building being cooled by the cooling system, a wet bulb temperature, the outside air temperature, a condenser return water temperature, a condenser water temperature setpoint, a chiller flow setpoint, or a condenser flow setpoint.

5. The method of claim 4, further comprising:
using the machine learning model to infer a second plurality of delta actions from the plurality of machine learning model inputs for controlling a condenser temperature setpoint, a chiller flow setpoint, or a condenser flow setpoint.

6. The method of claim 3, wherein the plurality of machine learning model inputs are obtained from the cooling system state data collected while the cooling system is running.

7. The method of claim 1, wherein each of the plurality of delta actions are converted to absolute actions using a method of moments technique.

8. The method of claim 7, wherein the method of moments technique converts each of the plurality of delta actions to absolute chilled water temperature setpoint actions by multiplying the delta return water temperature by a setpoint action range, dividing by a sum of the delta return water temperature and the delta outside air temperature, and adding a constant temperature.

9. A computing device comprising:
one or more processors;
a memory in communication with the one or more processors, the memory having computer-readable instructions stored thereupon which, when executed by the one or more processors, cause the computing device to:
set a setpoint of a mechanical system based on an absolute action, wherein the absolute action is obtained from a function that maps individual states of the mechanical system to individual absolute actions, wherein the function is generated based on a regression analysis of a plurality of sets of state data and a corresponding plurality of absolute actions, wherein the plurality of absolute actions are is obtained by converting a plurality of delta actions, wherein the plurality of delta actions are inferred by a machine learning model from the plurality of sets of state data, and wherein the machine learning model is trained by:
computing a relative value by subtracting a state of the mechanical system from a setpoint value of the mechanical system,
compute a relative feedback value by subtracting, from the setpoint value, a feedback state that corresponds to the state;

train the machine learning model based on the relative value, the relative feedback value, and a state of one of a plurality of sets of states collected during operation of the mechanical system.

10. The computing device of claim 9, wherein the setpoint value comprises a flow rate or a temperature.

11. The computing device of claim 9, wherein the relative feedback value reflects changes to the mechanical system caused by a change to the setpoint value.

12. The computing device of claim 9, wherein the relative value comprises a delta outside air temperature, wherein the relative feedback value comprises a delta return water temperature.

13. The computing device of claim 9, wherein the machine learning model is trained with a reinforcement learning function.

14. The computing device of claim 9, wherein the machine learning model is trained remotely from a computing device that employs the function to generate the absolute action.

15. The computing device of claim 9, wherein additional regression analyses are performed to generate additional functions that map individual states of the mechanical system to individual absolute actions.

16. The computing device of claim 9, wherein the individual states that are selected to be parameters for the function do not include all of the states of the sets of state data, and wherein the individual states that are selected to be parameters for the function do not over parameterize information about the mechanical system.

17. A computer-readable storage medium comprising instructions that, when executed by a processor, cause the processor to:
capture a set of states of a cooling system;
invoke a function with a subset of the set of states of the cooling system, wherein the function returns an absolute action of the cooling system, wherein the function is generated by:
computing a delta outside air temperature based on a chilled water temperature setpoint of a cooling system and an outside air temperature;
computing a delta return water temperature based on the chilled water temperature setpoint and a return water temperature of the cooling system;
training a machine learning model based on the delta outside air temperature, the delta return water temperature, and a state of one of a plurality of sets of states collected during operation of the cooling system;
using the machine learning model to infer a plurality of delta actions from a plurality of sets of cooling system state data;
converting the plurality of delta actions to a plurality of absolute actions; and
performing a regression analysis on the plurality of sets of cooling system state data and the corresponding plurality of absolute actions to generate the function that maps individual states of the cooling system to individual absolute actions; and
set the setpoint of the cooling system based on the absolute action returned by the function.

18. The computer-readable storage medium of claim 17, wherein the function is one of a plurality of functions, each of which evaluates to a different setpoint of the cooling system.

19. The computer-readable storage medium of claim 17, wherein a state of the set of states originates from sensor data, and wherein the setpoint of the cooling system comprises a supervisory setpoint of the cooling system.

20. The computer-readable storage medium of claim 19, wherein the supervisory setpoint of the cooling system includes a condenser water setpoint, a condenser water pump flow rate, a chilled water setpoint, or a chilled water pump flow rate.

* * * * *